United States Patent [19]

Takats et al.

[11] Patent Number: 4,887,214

[45] Date of Patent: Dec. 12, 1989

[54] FLIGHT CONTROL SYSTEM EMPLOYING TWO DUAL CONTROLLERS OPERATING A DUAL ACTUATOR

[75] Inventors: Imre J. Takats, Bellevue; George W. Aziz, Seattle, both of Wash.

[73] Assignee: The Boeing Company, Seattle, Wash.

[21] Appl. No.: 113,882

[22] Filed: Oct. 27, 1987

[51] Int. Cl.$^4$ .............................................. G06F 15/50
[52] U.S. Cl. ............................. 364/424.01; 364/434; 318/564; 244/194
[58] Field of Search .......................... 364/424.01, 434; 244/78, 194, 227; 371/8, 11, 68; 318/563, 564

[56] References Cited

U.S. PATENT DOCUMENTS

| | | | |
|---|---|---|---|
| 4,130,241 | 12/1978 | Meredith et al. | 371/68 |
| 4,198,021 | 4/1980 | Meredith et al. | 318/564 |
| 4,345,191 | 8/1982 | Takats et al. | 244/194 |
| 4,472,780 | 9/1984 | Chenoweth et al. | 364/434 |
| 4,594,537 | 6/1986 | Arifian et al. | 318/564 |
| 4,622,667 | 11/1986 | Yount | 364/434 |
| 4,644,538 | 2/1987 | Cooper et al. | 371/68 |
| 4,649,484 | 3/1987 | Herzog et al. | 364/434 |

Primary Examiner—Gary Chin
Attorney, Agent, or Firm—Seed and Berry

[57] ABSTRACT

A flight control system receiving input flight control signals from a flight control computer to manipulate a flight control surface. The dual actuator has an actuating rod connected to the flight control surface, and a pair of pistons are mounted on the actuating rod in respective first and second cylinders. The flow of hydraulic fluid into and out of the first and second cylinders is controlled by the first and second electrohydraulic servovalves, respectively. The electrohydraulic servovalves are, in turn, operated by respective signals applied to a pair of actuating coils. The system includes two controllers that receive the flight control signals and apply respective output signals to the four coils of the two electrohydraulic servovalves. In one embodiment, the controllers each have a primary channel and a secondary channel which are connected to respective actuating coils of the first electrohydraulic servovalve. In another embodiment, one controller has a pair of primary channels while the other controller has a pair of secondary channels.

22 Claims, 12 Drawing Sheets

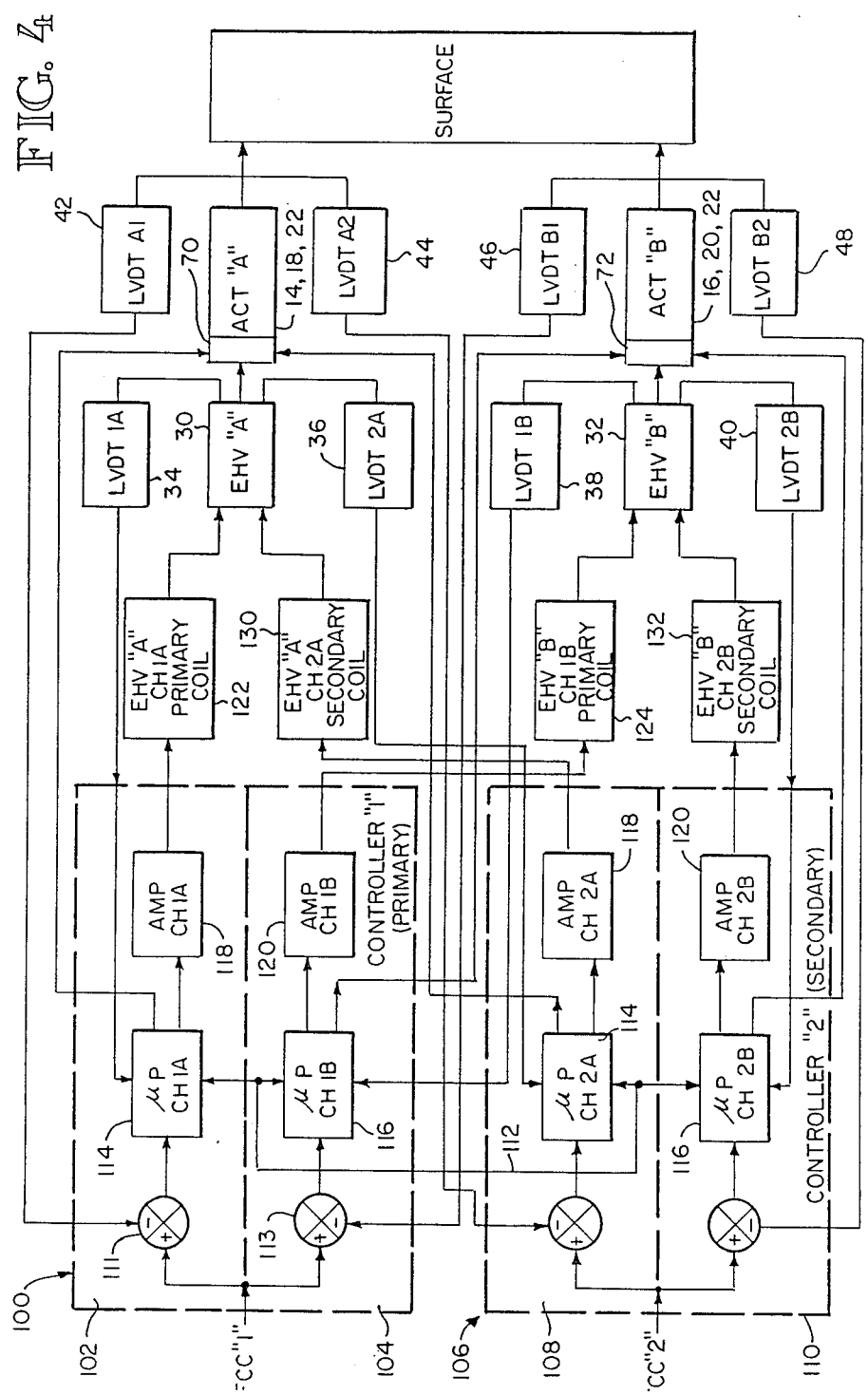

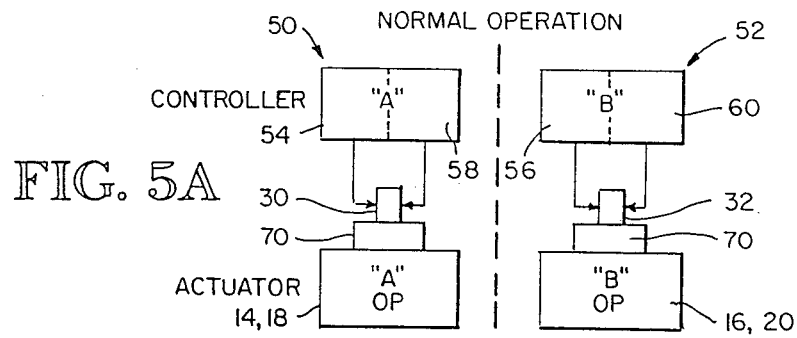
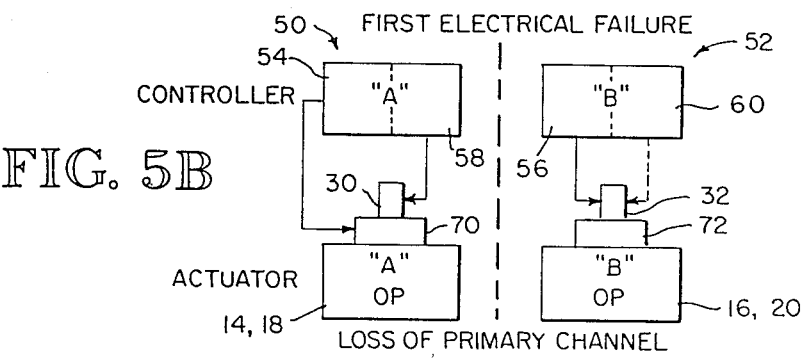
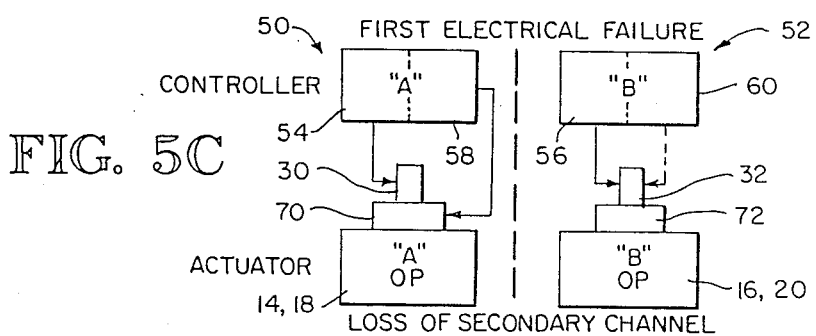
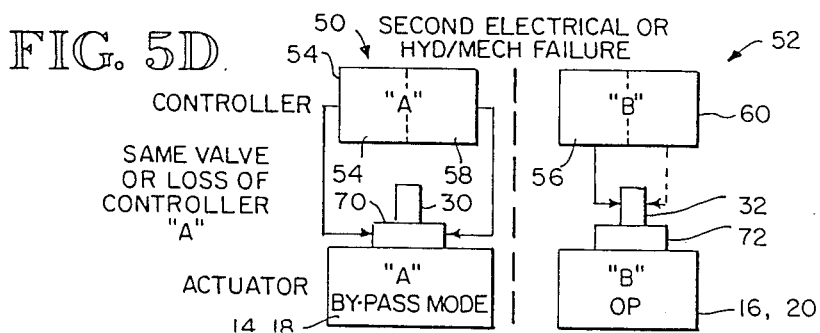

EHV "B" REMAINS OPERATIONAL WITH PRIMARY CH. 1B (32)

EHV "B" REMAINS OPERATIONAL WITH SECONDARY CH. 2B (32)

FIG. 7

| POSSI-BILI-TIES | NUMBER OF CHANNEL FAILURE | FAILURE OF CHANNELS ||||  CONTROLLER OF OPERATION || BYPASS COMMAND FROM ||||  BYPASS VALVE POSITION || EHV & ACTUATOR OPERATION || CONTROLLER IN CHARGE ||
| | | PRIMARY || SECONDARY || | | CONTROLLER "A" || CONTROLLER "B" || | | | | | |
| | | A1 | A2 | B1 | B2 | CONT "A" | CONT "B" | CH A1 | CH A2 | CH B1 | CH B2 | BPV "A" | BPV "B" | "A" | "B" | CONT "A" | CONT "B" |
|---|---|---|---|---|---|---|---|---|---|---|---|---|---|---|---|---|---|
| 1 | 0 | – | – | – | – | – | – | O | O | O | O | O | O | – | – | – | – |
| 2 | 1 | O | – | – | – | – | – | – | O | O | O | O | O | – | – | – | – |
| 3 |   | – | O | – | – | – | – | O | – | O | O | O | O | – | – | – | – |
| 4 |   | – | – | O | – | – | – | O | O | – | O | O | O | – | – | – | – |
| 5 |   | – | – | – | O | – | – | O | O | O | – | O | O | – | – | – | – |
| 6 | – | O | O | – | – | O | – | – | O | O | O | O | O | O | – | O | – |
| 7 | (2) | – | – | O | O | – | O | O | – | – | – | – | – | – | O | – | O |
| 8 | 2 | O | – | O | – | – | – | – | O | – | O | O | O | – | – | – | – |
| 9 |   | O | – | – | O | – | – | O | O | O | – | O | O | – | – | – | – |
| 10 |   | – | O | O | – | – | – | – | – | O | O | O | O | – | – | – | – |
| 11 |   | – | O | – | O | – | – | O | – | O | – | O | O | – | – | – | – |
| 12 | 3 | O | O | O | – | O | – | – | O | – | – | – | – | O | O | O | O |
| 13 |   | O | O | – | O | O | – | O | – | – | – | – | – | O | O | O | O |
| 14 |   | O | – | O | O | – | O | – | – | – | O | O | O | – | O | – | O |
| 15 |   | – | O | O | O | – | O | – | – | O | – | – | – | – | – | – | – |
| 16 | 4 | O | O | O | O | O | O | – | – | – | – | – | – | O | O | O | O |

NOTE 1: O FAILED / 1 OPERATIONAL

NOTE 2: O NO BYPASS / 1 BYPASS

NOTE 3: O NON-OP. / 1 OP.

NOTE 4: O NO CHARGE / 1 IN CHARGE

NOTE 5: POSSIBILITIES 6 & 7 CONTROLLER FAILURE

| POSSI-BILI-TIES | NUMBER OF CHANNEL FAILURE | FAILURE OF CHANNELS | | | | CONTROLLER OF OPERATION | | BYPASS COMMAND FROM | | | | BYPASS VALVE POSITION | | EHV & ACTUATOR OPERATION | | CONTROLLER IN-CHARGE | |
|---|---|---|---|---|---|---|---|---|---|---|---|---|---|---|---|---|---|
| | | PRIMARY | | SECONDARY | | PRIM. "1" | SEC. "2" | CONTROLLER "1" | | CONTROLLER "2" | | BPV "A" | BPV "B" | "A" | "B" | PRIM. "1" | SEC. "2" |
| | | 1A | 1B | 2A | 2B | | | CH1A | CH1B | CH2A | CH2B | | | | | | |
| 1 | 0 | 1 | 1 | 1 | 1 | 1 | — | 0 | 0 | 0 | 0 | 0 | 0 | 1 | — | — | 0 |
| 2 | 1 | 0 | 1 | 1 | 1 | — | — | — | 0 | 0 | 0 | 0 | 0 | — | — | 1 | — |
| 3 | | 1 | 0 | 1 | 1 | — | — | 0 | — | 0 | 0 | 0 | 0 | — | — | 1 | — |
| 4 | | 1 | 1 | 0 | 1 | 1 | — | 0 | 0 | — | 0 | 0 | 0 | — | — | — | 0 |
| 5 | 1 (2) | 1 | 1 | 1 | 0 | — | 0 | 0 | 0 | 0 | — | 0 | 0 | — | — | — | 0 |
| 6 | | 0 | 1 | 0 | 1 | 1 | — | — | 0 | 0 | 0 | 0 | 0 | — | — | 1 | — |
| 7 | 2 | 1 | 0 | 1 | 0 | — | 0 | 0 | — | — | 0 | 0 | 0 | — | — | — | 0 |
| 8 | | 0 | 1 | 1 | 0 | — | — | 0 | 0 | — | — | 0 | — | 0 | — | X0 | — |
| 9 | | 1 | 0 | 0 | 1 | — | — | 0 | — | 0 | — | 0 | 0 | — | — | — | — |
| 10 | | 0 | 0 | 1 | 1 | — | — | — | — | 0 | 0 | 0 | 0 | — | 0 | — | 0 |
| 11 | | 1 | 1 | 0 | 0 | — | — | 0 | 0 | 0 | 0 | 0 | 0 | — | 0 | — | X0 |
| 12 | 3 | 0 | 1 | 0 | 0 | 0 | — | — | — | — | — | 0 | 0 | 0 | — | 1 | 0 |
| 13 | | 1 | 0 | 0 | 0 | 0 | — | — | — | 0 | — | 0 | 0 | 0 | — | 1 | 0 |
| 14 | | 0 | 1 | 0 | 0 | 0 | — | — | — | — | 0 | 0 | 0 | 0 | — | 1 | — |
| 15 | | 0 | 0 | 1 | 0 | — | 0 | — | — | — | — | 0 | 0 | 0 | — | — | 0 |
| 16 | | 0 | 0 | 0 | 1 | — | 0 | — | — | — | — | — | — | 0 | 0 | 0 | 0 |

NOTE 1: 0 FAILED / 1 OPERATIONAL

NOTE 2: 0 NO BYPASS / 1 BYPASS

NOTE 3: 0 NON OP. / 1 OP.

NOTE 4: 0 NO CHARGE / 1 IN CHARGE

NOTE 5: POSSIBILITIES 6 & 7 CONTROLLER FAILURE

FIG. 8

FLIGHT CONTROL SYSTEM EMPLOYING TWO DUAL CONTROLLERS OPERATING A DUAL ACTUATOR

TECHNICAL FIELD

This invention relates to aircraft flight control systems, and more particularly, to a redundant control system for hydraulic flight control actuators.

BACKGROUND ART

Aircraft flight control surfaces, such as ailerons, elevators and rudders, are usually operated by hydraulic actuators, generally consisting of a hydraulic cylinder enclosing a piston mounted on an actuator rod. The hydraulic fluid applied to the hydraulic actuator is generally controlled by an electrohydraulic servovalve having at least one control coil receiving a control signal from a controller. In order to verify the correct operation of the actuator, a linear variable differential transformer may be coupled to the actuator rod. The linear variable differential transformer provides a feedback signal to the controller which indicates the position of the actuating rod. In a similar vein, a linear variable differential transformer may be mechanically coupled to the electrohydraulic servovalve stem to provide a monitor signal to the controller which indicates the position of the valve stem and hence the rate of actuator movement.

The safe operation of aircraft employing hydraulic control systems obviously depends upon the proper operation of the system. Furthermore, the high speed at which aircraft travel can prevent the detection of a flight control malfunction before the aircraft crashes, with attendant loss of life and property. It is thus necessary for hydraulic flight control system to be built as "fail safe" as possible or else be able to operate effectively in the event of a failure, that is, it must be fail operational.

The typical approach to implementing a "fail safe" flight control system is to use redundant components in the system. A flight control system utilizing redundant components can continue to function after the malfunction of a single component. To further improve the reliability of redundant flight control systems, the number of redundant components can be increased to even more than two or even three identical components.

Theoretically, the reliability of a flight control system can reach any desired value by merely increasing the number of redundant components. However, in practice, the number of redundant components that can be used in limited by several factors. First, it is normally desirable to minimize the weight of aircraft employing flight control systems. The extra weight resulting from the use of redundant components unduly increases the weight of aircraft. Second, a greater number of redundant components increases the probability that at least one of the components will fail, thus producing an unacceptable mean time between failure for the entire system. Finally, the use of redundant components can easily multiply by several times the cost of the flight control systems. Therefore, it is important that optimum redundancy be achieved with a minimum number of components.

In the past, attempts have been made to combine dual-coil electrohydraulic servovalves with one or two digital controllers. However, the use of a single, dual-coil electrohydraulic servovalve, when controlled by either single or dual controllers, cannot satisfy the safety/reliability requirements. Moreover, the use of a dual-coil electrohydraulic servovalve and dual controllers can result in operating ambiguities in the event of a malfunction since it may not be possible to determine which controller and/or electrohydraulic servovalve coil has malfunctioned.

DISCLOSURE OF THE INVENTION

It is the primary object of this invention to provide a flight control system that achieves the optimum balance among many factors, including safety, reliability and expense, weight and mean time between system failure.

It is another object of the invention to provide a redundant fly-by-wire control system that utilizes conventional components in a unique manner.

It is still another object of the invention to provide a fly-by-wire flight control system that can achieve a variety of forms to permit such operational features as cross-channel voting and multiple flight control computer inputs.

It is a further object of the invention to provide redundancy in a flight control system in such a manner that allows the system to be operated with a relatively large number of individual component failures.

These and other objects of the invention are provided by a hydraulic flight control system including a tandem actuator having an actuating rod connected to a pair of pistons mounted in respective first and second cylinders. The flow of hydraulic fluid into and out of the first and second hydraulic cylinders is controlled by first and second electrohydraulic servovalves, respectively. Each of the electrohydraulic servovalves are controlled by a pair of actuating coils. The actuating coils of the electrohydraulic servovalves are, in turn, controlled by a pair of controllers each of which has two channels. In a first embodiment, the first and second controllers each have a primary control channel that provides a primary output to one actuating coil of its respective hydraulic servovalve for normally operating the servovalve. The first and second controllers also each include a secondary control channel that provides a secondary output to the other actuating coil of the respective electrohydraulic servovalve for operating the electrohydraulic servovalve in response to an enabling signal. The operation of the first and second controllers, the first and second electrohydraulic servovalves and the actuator is sensed by a monitoring and control logic system. The monitor and control logic system generates enable signals in the event that a primary channel of the first or second controller is incapable of generating its respective primary output. As a result, each of the electrohydraulic servovalves is operated by only one channel of its respective controller at a time and, in the event of a malfunction in its respective primary channel or actuating coil connected to the primary channel, the electrohydraulic servovalve is operated by the secondary channel of its respective controller.

A second embodiment also includes a tandem actuator controlled by first and second electrohydraulic servovalves, each having a pair of actuating coils. However, one of the two controllers is a primary controller having first and second control signals that provide first and second primary outputs to one actuating coil of the first and second electrohydraulic servovalves, respectively, for normally operating the electrohydraulic servovalves. A secondary controller has first and second control channels that provide first and secondary outputs to the other actuating coil of the first and second electrohydraulic servovalves, respectively, for operating the first and second electrohydraulic servovalves in response to receipt of respective enable signals. As in the first embodiment, the operation of the primary and secondary controllers, the first and second electrohydraulic servovalves and the actuator is monitored by a monitor and control logic system. The monitor and control logic system generates first and second enable signals in the event that respective first and second channels of the primary controller are incapable of generating their respective first and second primary outputs. As a result, each of the electrohydraulic servovalves is operated by only one channel of a controller means at a time and, in the event of a malfunction in its respective control channel or actuating coil, the electrohydraulic servovalve is operated by the corresponding channel of the secondary controller.

In both embodiments, servovalve position sensors are operatively associated with the electrohydraulic servovalves to generate respective outputs indicative of the operation of the servovalves. These servovalve position outputs are applied to the controllers and compared to reference signals corresponding to the expected values of the servovalve position signals as a result of a given flight control signal. A malfunction is thus detected by a negative comparison between the servovalve position signal and the reference signal. In the second embodiment, a communication channel exists between the two controllers. As a result, the servovalve position signals for each channels can be compared no only to the reference signal for the channel, but also to the servovalve position signals of the other channels to provide cross channel voting in order to identify a malfunctioning channel.

First and second bypass valves are operatively associated with the first and second cylinders, respectively. Each of these bypass valves is operative to bypass the piston in its respective cylinder responsive to malfunction of both channels driving the electrohydraulic servovalve for that cylinder. Thus, in the event of a worst case failure of two controllers, the flight control system remains operable.

BRIEF DESCRIPTION OF DRAWINGS

FIG. 4 is a block diagram of the controller used in the embodiment of FIG. 3 showing the manner in which it is connected to the remaining components of the flight control system.

FIGS. 5A through 5F are a schematic showing the normal operation and failure modes of the embodiment of FIG. 1.

FIG. 7 is a truth table illustrating the various operating and failure modes of the embodiment of FIG. 1.

FIG. 8 is a truth table illustrating the various operating and failure modes of the embodiment of FIG. 3.

BEST MODE FOR CARRYING OUT THE INVENTION

Figure 1:
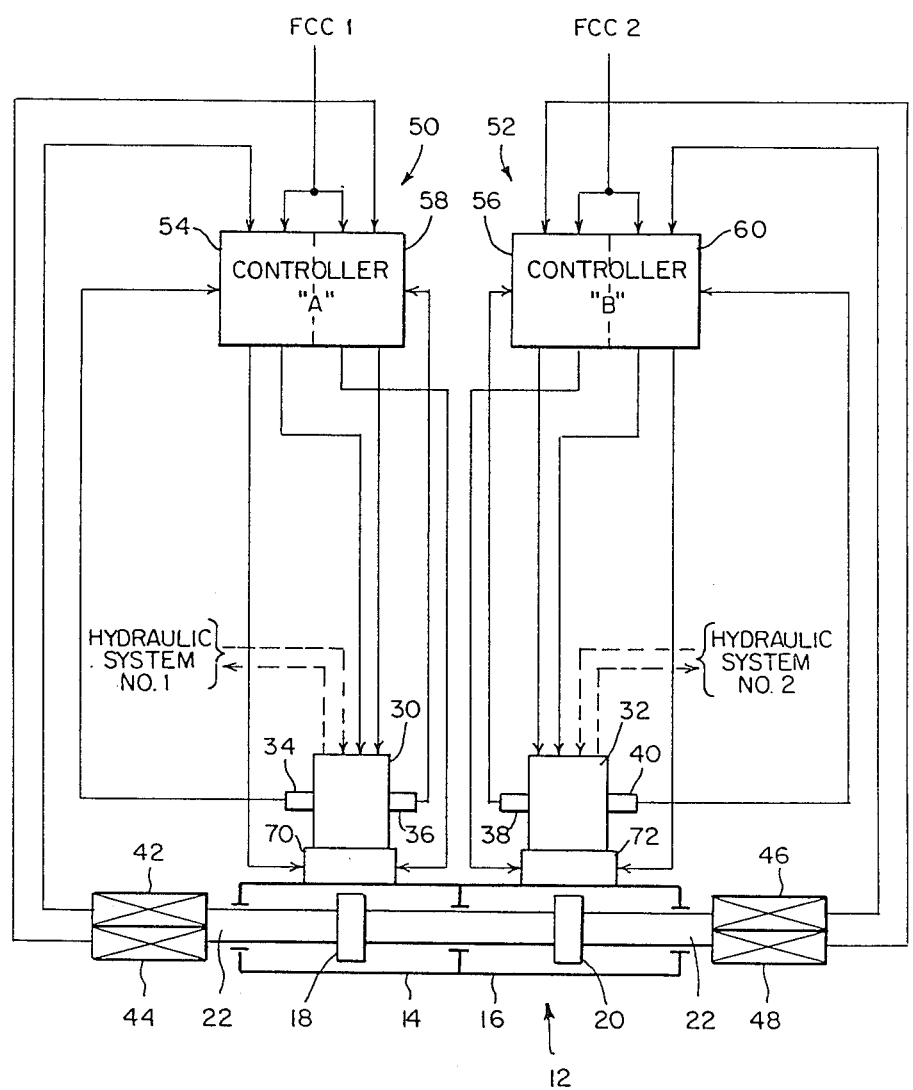
FIG. 1 is a block diagram of one embodiment of the inventive flight control system.

The inventive flight control system, as illustrated in FIG. 1, utilizes a dual actuator 12 having a pair of hydraulic cylinders 14, 16 containing respective pistons 18, 20 mounted on a common actuating rod 22. The actuating rod 22 is coupled in a conventional manner to a flight control surface, such as an aileron, elevator or rudder. By the use of a common actuating rod 22, the hydraulic forces exerted on the pistons 18, 20 are mechanically summed so that the dual actuator 12 continues to operate, although at half its former actuating force, in the event of a malfunction of one-half of the dual actuator 12.

The flow of hydraulic fluid into and out of each cylinder 14, 16 of the dual actuator 12 is controlled by dual-coil electrohydraulic servovalves 30, 32. Each of the electrohydraulic servovalves 30, 32 is driven by its own conventional hydraulic system so that a hydraulic system malfunction will affect only one-half of the dual actuator 12. As is well understood in the art, the electrohydraulic servovalves 30, 32 include dual actuation coils (not shown) that can receive respective electrical signals. The electrical signals displace a valve spool, thereby allowing hydraulic fluid to flow into and out of the cylinders 14, 16. The electrical signals applied to the control coils of the electrohydraulic servovalves thus control the rate at which hydraulic fluid flows into or out of the hydraulic cylinders 14, 16, which, in turn, controls the rate of actuating rod movement 22.

The position of the valve stem in each electrohydraulic servovalve 30, 32 is monitored by respective pairs of conventional linear variable differential transformers 34, 36 and 38, 40. The linear variable differential transformers ("LVDTs") generate electrical signals that are proportional to the position of their respective valve spool. Consequently, the signals generated by the LVDTs are proportional to the rate at which the hydraulic fluid is flowing into and out of the cylinders 14, 16, which is, in turn, proportional to the rate of movement of the actuating rod 22.

Conventional LVDTs 42, 44, 46, 48 are coupled to the actuating rod 22 to provide signals indicative of the position of the actuating rod. As explained in greater detail below, the outputs of the LVDTs 42, 44, 46, 48 are used as feedback signals to compare with the flight control signals from conventional flight control computers to generate the signals applied to the actuating coils of the electrohydraulic servovalves 30, 32.

The above-described components are common to both embodiments of the inventive flight control system. The differences between the several embodiments of the flight control system stem from the manner in which these components are controlled.

In the embodiment of FIG. 1, the electrohydraulic servovalves 30, 32 are driven by respective controllers 50, 52. The controllers 50, 52 each include a primary channel 54, 56, respectively, and a secondary channel 58, 60, respectively. Each of the channels 54, 58, 56, 60 is preferably driven by its own independent power supply so that a power supply failure will not result in the loss of more than one channel. In normal operation, the actuating coil for the first electrohydraulic servovalve 30 is driven by the primary channel 54 of the controller 50. Similarly, the actuating coil of the second electrohydraulic servovalve 32 is driven by the primary channel 56 of the second controller 52. Although the secondary channels 58, 60 of the first and second controllers 50, 52, respectively, normally remain operational as explained in greater detail below, their respective outputs to the electrohydraulic servovalves 30, 32 are switched off.

The controllers 50, 52 are driven by respective flight control computer outputs FCC1, FCC2. These flight control signals are compared to actuator feedback signals generated by the LVDTs 42, 44 and 46, 48 to generate respective error signals that are amplified to provide the signals driving the electrohydraulic servovalves 30, 32. Reliability is enhanced by providing separate actuator feedback signals for each control channel. Thus, LVDT 42 provides an actuator feedback signal that is compared to the flight control signal FCC1 in the primary channel 54 of the first controller 50 to generate an error signal. LVDT 44 provides an actuator feedback signal that is compared to the flight control signal FCC1 in the secondary channel 58 of the first controller 50. LVDT 46 provides an actuator feedback signal that is compared to the flight control signal FCC2 in the primary channel 56 of the second controller 52. Finally, LVDT 48 provides an actuator feedback signal that is compared to the flight control signal FCC2 in the secondary channel 60 of the second controller 52.

The operation of the primary channels 54, 56 for the first and second controllers 50, 52, respectively, is monitored by respective LVDTs 34, 38. As explained in greater detail below, the primary channels 54, 56 of the controllers include a modeling system that generates respective reference signals. These reference signals correspond to the signals that the respective LVDTs 34, 38 should generate if the electrohydraulic servovalves 30, 32 properly respond to the applied flight control computer input. Similarly, the secondary channels 58, 60 of the controllers 50, 52, respectively, also include valve modeling systems. These valve modeling systems in the secondary channels 58, 60 generate respective reference signals that are compared to the outputs of the LVDTs 36, 40 to detect a malfunction in their respective secondary channels. Thus, the primary and secondary channels 54, 58 of the first controller 50 each monitor the operation of the electrohydraulic servovalve 30 and are thus able to detect a malfunction in its own channel or the other channel for the controller 50. Similarly, the primary channel 56 and the secondary channel 60 of the second controller 52 both monitor the operation of the second electrohydraulic servovalve 32 and are able to detect a malfunction in either its own channel or the other channel for the second controller 52.

In the event of a malfunction in the primary channel 54, 56 of the first or second controller 50, 52, a negative comparison occurs between the servovalve monitor signals from the LVDTs 34, 36, 38, 40 and the reference signal for the affected channel. The failed primary channel 54 or/and 56 then deactivates itself and activates the secondary channel 58 or/and 60 so that the electrohydraulic servovalves 30, 32 remain operational in the event of a failure in the primary channel 54 or/and 56 of the first or second controllers 50, 52, respectively. Note that a failure in the LVDTs 34, 38 for the primary channels 54, 56 will not necessarily result in deactivation of a primary channel and activation of a secondary channel since the system can distinguish between a failure in an LVDT and a failure in one of the controllers. Thus, in the event of a failure of LVDT 34 or 38, a positive comparison between the valve monitor signal from LVDT 36 or 40 with the reference signal generated by the modeling system in the secondary channels 58, 60 can verify that the primary channel 54, 56 is still operational. In the event that a primary channel fails, there will be negative comparison between the valve monitor signals from both LVDT 34, 36 or 38, 40 and the reference signals generated by the corresponding channels.

In the event that either of the electrohydraulic servovalves 30, 32 completely failed, the pistons 18, 20 in the cylinders 14, 16, respectively, driven by the failed electrohydraulic servovalves 30, 32, respectively, would be unable to move and would thus become "hydraulically locked." In order to allow the pistons 18, 20 to move freely in the event of a complete failure of one of the electrohydraulic servovalves 30, 32, conventional bypass valves 70, 72 are provided for each of the cylinders 14, 16, respectively. Whenever one of the control channels 54-60 fail, the failed control channel 54-60 applies a bypass signal to its respective bypass valve 70, 72. For example, if the primary channel 54 of the first controller 50 fails, the primary channel 54 not only disables itself and enables the secondary controller 58, but it also applies a bypass signal to the bypass valve 70. However, the bypass valve 70 does not shift to its bypass position until it receives a second bypass signal from the secondary channel 58 of the first controller 50.

In the event that the secondary channel 58 of the first controller 50 subsequently fails, the secondary channel 58 outputs a bypass signal to the bypass valve 70, thus causing the bypass valve 70 to shift to its bypass position and bypass the piston 18. Under these circumstances, the flight control system continues to operate through the second cylinder and piston 16, 20, respectively. In summary, the flight control system remains fully operational in the event of a failure of any one channel of a controller 50, 52 or in the event of a failure in two channels of both controllers 50, 52. The flight control system remains operational, although at half its capacity, in the event of a failure of both control channels 54, 58 or 56, 60 of the first or second controllers 50, 52, respectively. In fact, the flight control system will remain operational as long as any channel 54, 58, 56, 60 remains operational.

It should be noted that, in the embodiment of FIG. 1, there is essentially no interconnection between the controllers 50, 52. It is therefore impossible for any malfunction in the first controller 50 or its associated components to cause a failure in the other controller 52 or its associated components. The only cross-connection that may be desirable, if necessary, is an equalization circuit that causes the controllers 50, 52 to call for the same actuator force for the same input in order to prevent one actuator from opposing the force generated by the other actuator.

Figure 2:
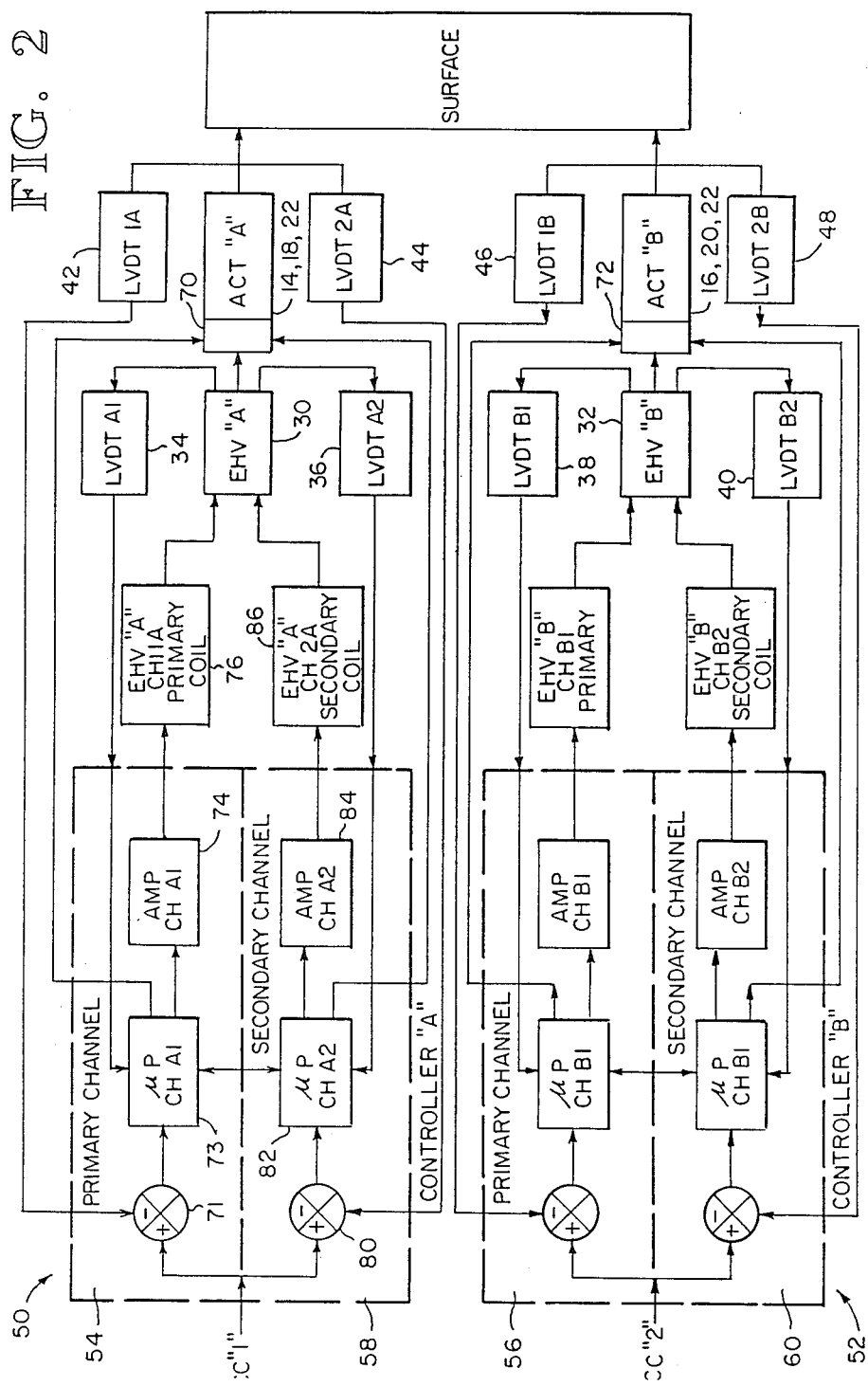
FIG. 2 is a block diagram of the controllers used in the embodiment of FIG. 1 showing the manner in which the controls are connected to the other components of the flight control system.

The first embodiment of the flight control system may be implemented using a variety of designs, including the design illustrated in detail in FIG. 2. The controllers 50, 52 are identical, and corresponding components have thus been given the same reference numeral. Also, for this reason, the operation of only the first controller 50 is explained in detail. The flight control signal FCC1 is applied to a summing amplifier 71 along with the actuator feedback signal from the LVDT 42. The summing amplifier 71 then generates an error signal that is applied to a conventional microprocessor 73. Microprocessor 73 is easily programmed in a conventional manner by one skilled in the art to generate a control signal that is applied to a power amplifier 74. Amplifier 74, in turn, outputs a control signal to the primary actuating coil 76 of the first electrohydraulic servovalve 30. Microprocessor 73 can also be easily programmed to model the operation of the electrohydraulic servovalve 30 and generate a reference signal based upon the proper response of the servovalve 30 to the flight control output FCC1 and compare that reference signal to the valve position output signal generated by the LVDT 34. Similarly, the flight control signal FCC1 is applied to a summing amplifier 80 in the secondary channel 58 along with an actuator feedback signal from the LVDT 44. The resulting error signal is applied to a second microprocessor 82, which, when enabled, generates a control signal that is applied to a power amplifier 84. Power amplifier 84 then outputs a control signal to the secondary actuating coil 86 of the first electrohydraulic servovalve 30.

The microprocessor 73, 82 are connected to each other by a communication line that performs two functions. First, it allows the primary channel microprocessor 73 to enable the microprocessor 82 in the event of a failure in the primary channel 54. Second, it allows the valve monitoring and modeling system of the secondary channel 58 to, in effect, take over in the event of a failure in the valve monitoring and modeling system of the primary channel 54. Thus, in the event that LVDT 34 malfunctions, the valve monitoring signal from LVDT 36 can be compared to the valve model signal generated by the microprocessor 82. In the event of a positive comparison, the microprocessor 82 can inform the microprocessor 73 for the primary channel 54 that the primary channel 54 is still operating properly.

If the primary channel 54 is found to be malfunctioning, the microprocessor 73 outputs an enable signal to the microprocessor 82 and it also outputs a bypass signal to the bypass valve 70. In the event that secondary channel 58 subsequently fails, the microprocessor 82 disables itself and then outputs a second bypass signal to the bypass valve 70 so that the first actuator 14, 18, 22 becomes inoperable.

The various operational and failure modes for the flight control system of the first embodiment are illustrated in FIG. 5. As illustrated in FIG. 5A, in normal operation the electrohydraulic servovalve 30 for the first actuator 14, 18 is operated by the primary channel 54 of the first controller 50. Similarly, the electrohydraulic servovalve 32 for the second actuator 16, 20 is operated by the primary channel 56 of the second controller 52. In the event of a first electrical failure involving loss of a primary channel (e.g., primary channel 54), as illustrated in FIG. 5B, the primary channel 54 disables itself so that it no longer applies a control signal to the electrohydraulic servovalve 30 and it applies a bypass signal to the bypass valve 70. The secondary channel 58 of the first controller 50 then takes over the operation of the first actuator 14, 18 by applying a control signal to the electrohydraulic servovalve 30. The second controller 52 and its associated components continue to operate in the normal operating manner. If the first electrical failure is the loss of a secondary channel (e.g., secondary channel 58), as illustrated in FIG. 5C, the system continues to operate in the normal manner, with the primary channels 54, 56 driving the electrohydraulic servovalves 30, 32, respectively. However, the secondary channel 58 of the first controller 50 outputs a bypass signal to the bypass valve 70. The bypass valve 70 does not become operational at that time, since it requires two bypass signals to bypass the first actuator 14, 18.

A hydraulic or mechanical failure results from either the loss of hydraulic pressure or a jam in an electrohydraulic servovalve 30, 32. A hydraulic or mechanical failure can be detected as two simultaneous electrical failures. Such failures can be detected by monitoring the position of the electrohydraulic servovalves 30, 32 using the LVDTs 34, 36, 38, 40 as described above, and by comparing the monitoring signals generated by the LVDTs 34, 36, 38, 40 to the valve modeling signals generated in the controllers 50, 52 as described above. For example, if both microprocessors 73, 82 (FIG. 2) simultaneously discover that the valve monitoring signals from the LVDTs 34, 36 compare negatively with the valve modeling signals, the microprocessors 73, 82 isolate the failure to the electrohydraulic servovalve 30. The microprocessors 73, 82 then disable channels 54, 58, respectively, and send bypass signals to bypass valve 70, thereby bypassing actuator 16. The monitoring and modeling of the four channels and cross-voting between channels by the controllers thus enable the system to discover and correct any type of channel failure.

A second electrical failure can either result in the complete loss of one electrohydraulic servovalve 30 or 32, or the loss of one channel per controller 50, 52. The first instance, illustrated in FIG. 5D, assumes that there is a failure in the primary channel 54 and the secondary channel 58 of the controller 50, or its associated hydraulic or mechanical components. The primary channel 54 and the secondary channel 58 of the first controller 50 then each generate a bypass signal that is applied to the bypass valve 70. Since the bypass valve 70 is now receiving two bypass signals, it bypasses the first actuator 14, 18. The flight control system remains operational, but since only the second actuator 16, 20 is operational, the maximum force that the flight control system is capable of delivering is reduced by fifty percent.

Figure 5E:
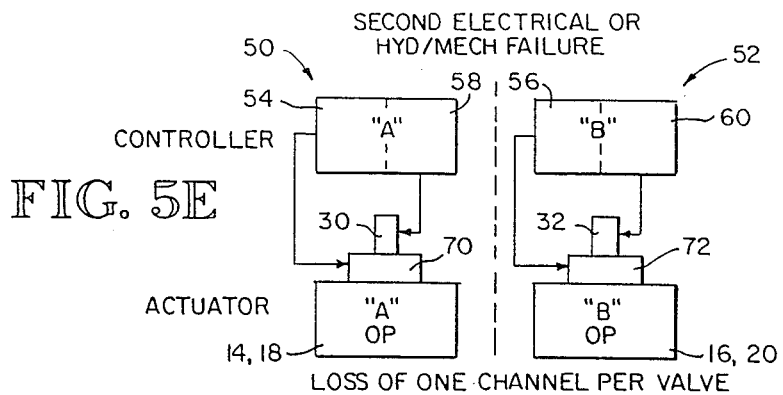

If the second electrical failure results in a loss of one channel per controller, as illustrated in FIG. 5E, the system remains fully operational. Thus, assuming that primary channel 54 of the first controller 50 and the primary channel 56 of the second controller 52 both failed, the primary channels 54, 56 disable themselves and enable the corresponding secondary channel 58, 60 so that the secondary channels 58, 60 provide control signals to the respective electrohydraulic servovalves 30, 32. At the same time, the primary channels 54, 56 apply respective bypass signals to the bypass valves 70, 72 so that the valves 70, 72 can bypass in the event of a failure in a secondary channel 58, 60.

Figure 5F:
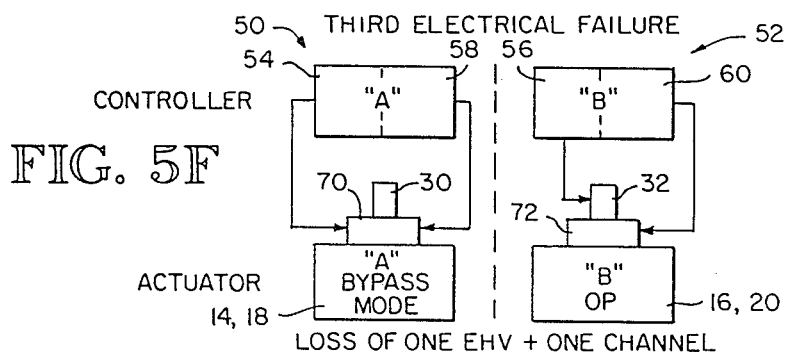

A third electrical failure, as illustrated in FIG. 5F, will still allow the system to function, although with a maximum force of fifty percent. Assuming that only the primary channel 56 of the second controller 52 remains operational, both channels 54, 58 of the first controller 50 apply bypass signals to the bypass valve 70 as explained above with reference to FIG. 5D, thus rendering the first actuator 14, 18 inoperable. The secondary channel 60 of the second controller 52 also applies a bypass signal to the bypass valve 72, but the bypass valve 72 remains in its non-bypass position because it has received only one bypass signal. The electrohydraulic servovalve 32 continues to be controlled by the primary channel 56 of the second controller 52 so that the second actuators 16, 20 continue to operate. All of the various normal operation and failure modes for the first embodiment are illustrated in the truth table of FIG. 7. It can be seen that of the sixteen possible operational and failure modes, in only one instance, in which all four channels of the primary and secondary controllers have failed, where both electrohydraulic servovalves have failed, does the system become totally inoperative.

It should be noted that the bypass valves 70, 72 can fail in either of two modes, namely, an inadvertent bypass or a failure to bypass when ordered. An inadvertent bypass does not make the flight control system inoperative, but merely reduces the force that the control system is capable of delivering by fifty percent. A failure to bypass when ordered is a more serious failure since it can result in hydraulic lock of the actuator. For this reason, it may be desirable to utilize dual bypass valves and to check the operation of the bypass valves 70, 72 periodically. Further, the bypass valves should be designed as failsafe as possible by spring biasing them to their bypass mode so that an electric signal is required to keep the valves 70, 72 from bypassing. Thus, a failure to apply the proper signal to the bypass valves 70, 72 would automatically result in the valves shifting to their bypass mode.

Figure 3:
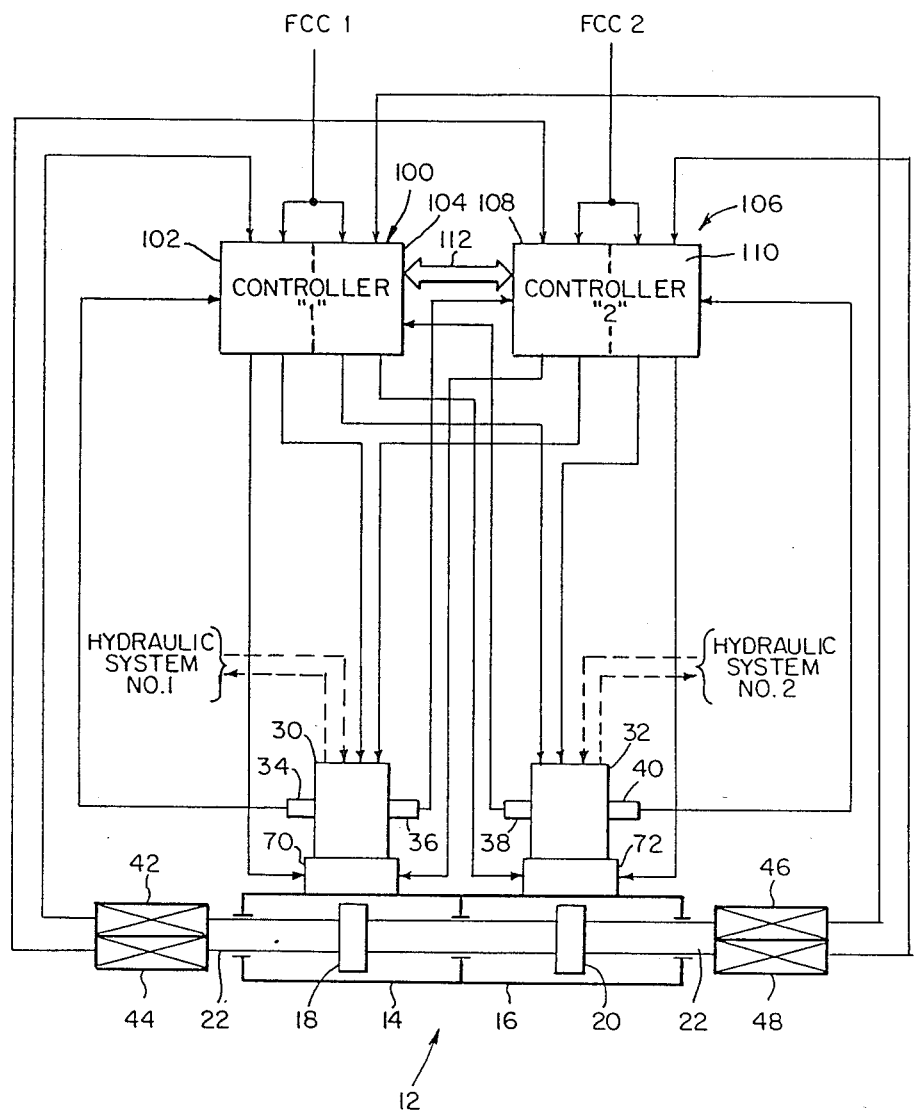
FIG. 3 is a block diagram of another embodiment of the inventive flight control system.

The second embodiment of the flight control system, illustrated in FIG. 3, also utilizes a dual actuator 12 controlled by respective hydraulic servovalves 30, 32 monitored through respective LVDTs 34, 36 and 38, 40. Like the first embodiment, the second embodiment utilizes LVDTs 42, 44, 46, 48 to generate actuator feedback signals. However, the embodiment of FIG. 3 utilizes a primary controller 100 having first and second primary channels 102, 104 and a secondary controller 106 having first and second secondary channels 108, 110. In normal operation, the primary channel 102 of the primary controller 100 drives the first electrohydraulic servovalve 30 and the primary channel 104 of the primary controller drives the second electrohydraulic servovalve 32. In the event of a failure in either primary channel 102 or 104, both primary channels 102, 104 are disabled and the secondary channels 108, 110 of the secondary controller 106 become operational. At the same time, failed primary controller channel 102 or 104 applies a bypass signal to its respective bypass valve 70, 72. The electrohydraulic servovalves 30, 32 are thereafter controlled by the secondary controller channels 108 and 110. In the event that either of the secondary channels 108, 110 of the secondary controller 106 fail, the failed secondary controller channel 108 or 110 is disabled and an attempt is made to activate the corresponding channel 102, 104 of the primary controller 100. This, of course, will not be possible if the failed secondary controller channel 108 is for the same electrohydraulic servovalve 30 that is previously driven by the failed primary controller channel 102. In other words, if the primary controller channel 102 fails thereby causing control to be assumed by the secondary controller 106, and the secondary controller channel 108 subsequently fails, it will not be possible for the primary channel 102 to take over the operation of the electrohydraulic servovalve 30, thereby resulting in the loss of operation of electrohydraulic servovalve 30. However, if the primary channel 102 fails, followed by a failure in the secondary controller channel 110, then primary controller channel 104 will be able to take over the operation of the first electrohydraulic servovalve 30.

Unlike the first embodiment, the second embodiment illustrated in FIG. 3 includes a communications channel 112 between the primary controller 100 and the secondary controller 106. As explained in greater detail below, this communications channel 112 allows the channels 102, 104 of the primary controller 100 to compare their valve monitoring and model signals with those of the channels 108, 110 of the secondary controller 106 in order to provide extensive cross-voting of the channels.

The controllers 100, 106 are illustrated in greater detail in FIG. 4 along with their interconnections to the remainder of the system. Insofar as the primary controller 100 is identical to the secondary controller 106, corresponding components have been given the same reference numerals and the operation of a secondary controller 106 is not described in detail for purposes of brevity. The flight control signal FCC1 is applied to summing amplifiers 111, 113 for the first and second primary channels 102, 104, respectively, along with actuator position feedback signals from the LVDTs 42, 46, respectively. Each of the summing amplifier 111, 113 generates an error signal that is applied to a respective microprocessor 114, 116. The microprocessors 114, 116 generate respective control signals from the error signals that are applied to respective power amplifiers 118, 120. The power amplifier 118 drives one actuating coil 122 of the first electrohydraulic servovalve 30, while the power amplifier 120 drives one actuating coil 124 of the second electrohydraulic servovalve 32. The microprocessors 114, 116 also receive respective valve monitoring signals from the LVDTs 34, 38, respectively. The microprocessors 114, 116 include a modeling system that generates respective reference signals that correspond to the expected valve monitoring signal from the LVDTs 34, 38 when the electrohydraulic servovalves properly respond to the flight control signal FCC1. As with the first embodiment, the valve monitoring signals received from the LVDTs 34, 38 can be compared not only to the valve modeling signal generated by the respective microprocessor 114, 116, but it can also be compared to the valve monitoring signal generated by the other LVDTs 36, 40. Further, because of the communication channel 112 between the controllers 100, 106, the valve monitoring signal from one LVDT (e.g., 34) can also be compared to the valve monitoring signals generated by the other LVDTs 36, 38, 40. Thus, in the event of a disagreement between the valve monitoring signals generated by the LVDTs 34, 38, the system can perform cross-channel voting to determine which valve monitoring signal is correct. For example, if the valve monitoring signal generated by the LVDT 34 does not match the LVDT signal generated by the LVDT 38, either one of the LVDTs 34, 38 could be inoperative. However, if the valve monitoring signal output by the LVDT 34 matches the valve monitoring signal output by the LVDTs 36, 40, then the faulty LVDT has been identified as the LVDT 38. As mentioned above, the secondary controller 106 is substantially the same as the primary controller 100, except that the amplifier 118 drives the actuator coil 130 of the first electrohydraulic servovalve 30 and the amplifier 120 drives the actuating coil 132 of the second electrohydraulic servovalve 32.

The various normal operation and failure modes for the second embodiment is illustrated in FIG. 6. As illustrated in FIG. 6A, during normal operation the electrohydraulic servovalve 30 is driven by the primary channel 102 of the primary controller 100, and the second electrohydraulic servovalve 32 is driven by the primary channel 104 of the primary controller 100. The secondary channels 108, 110 of the secondary controller 106 remain operational, but their outputs are not enabled so that the electrohydraulic servovalves 30, 32 are driven only by the primary channels 102, 104.

Figure 6A:
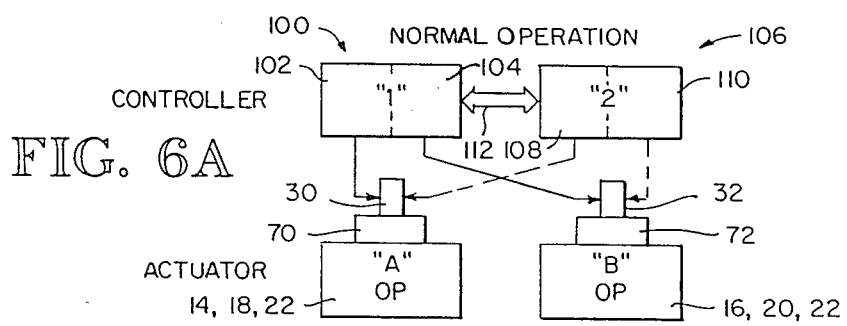
FIGS. 6A through 6M are a schematic showing the normal operation and failure modes of the embodiment of FIG. 3.
Figure 6B:
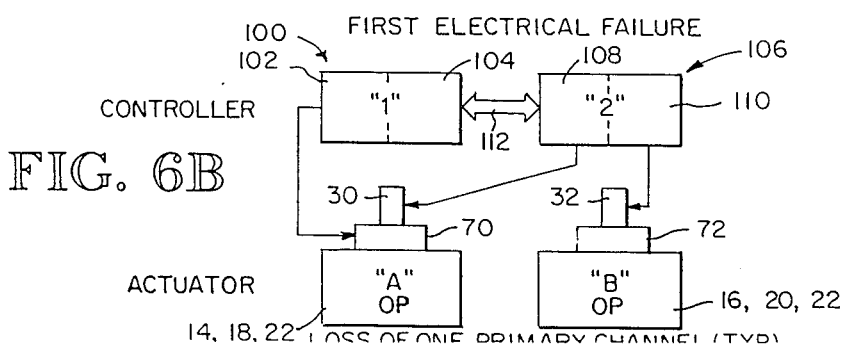
Figure 6C:
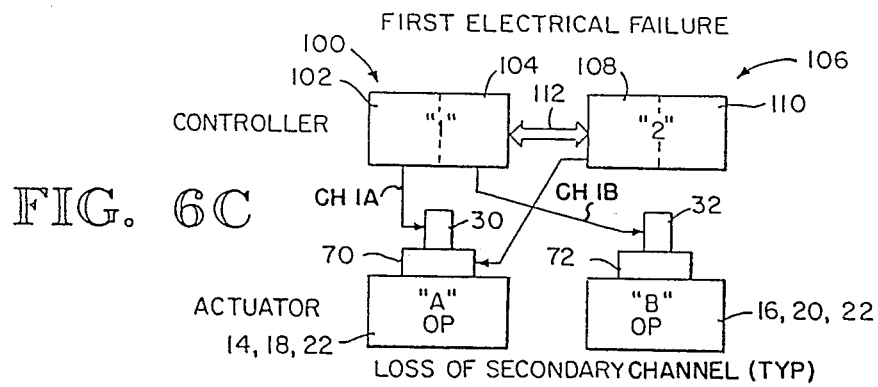

A first electrical failure can be either the loss of a primary or a secondary channel, the loss of a primary controller, or the loss of a secondary controller. In the event of the loss of a primary channel or a secondary channel, the failed primary or secondary channel is detected through valve monitoring, modeling and cross-channel voting. The failure of one primary channel 102 is illustrated in FIG. 6B. After detection of the failed primary channel 102, the outputs of both primary channels 102 and 104 are disabled and the channels 108 and 110 of the secondary controller are enabled to control both valves. The secondary channel 108 then drives the first electrohydraulic servovalve 30, and the secondary channel 110 drives the second electrohydraulic servovalve 32. As the failed primary channel 102 is terminated, a bypass signal is sent to bypass valve 70. The failure of a nonactive secondary channel 108 or 110 is detected in a manner similar to the manner in which the failure of a primary channel is detected. The operation of the failed secondary channel is terminated and a bypass signal sent to its respective bypass valve 70 or 72, as shown in FIG. 6C. However, the bypass valves 70, 72 do not shift to their bypass mode until they receive a second bypass signal, which requires the second failure of the same valve.

Figure 6D:
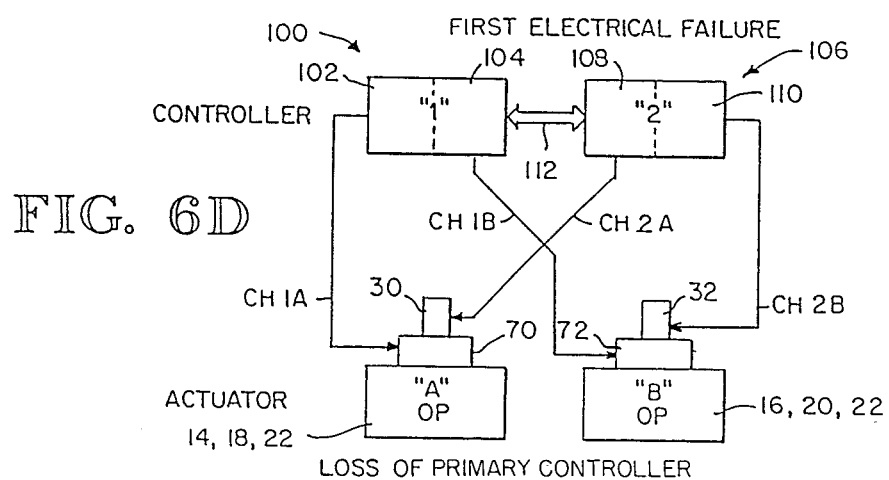
Figure 6E:
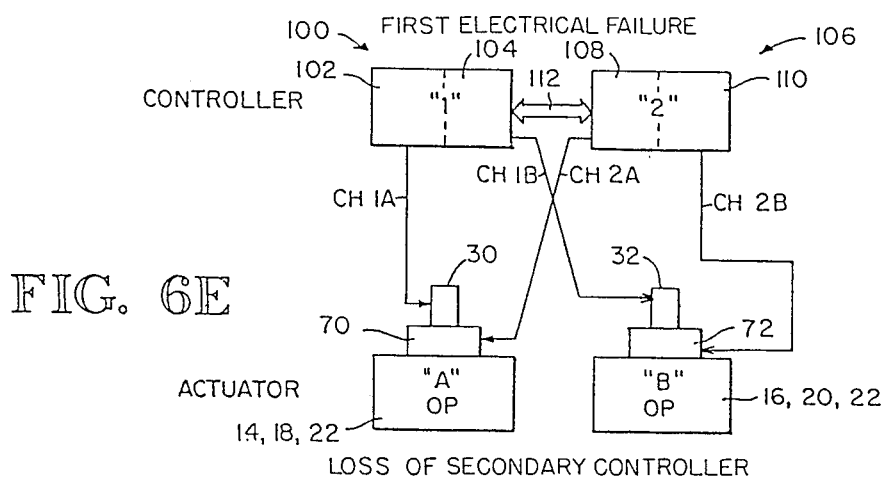
Figure 6F:
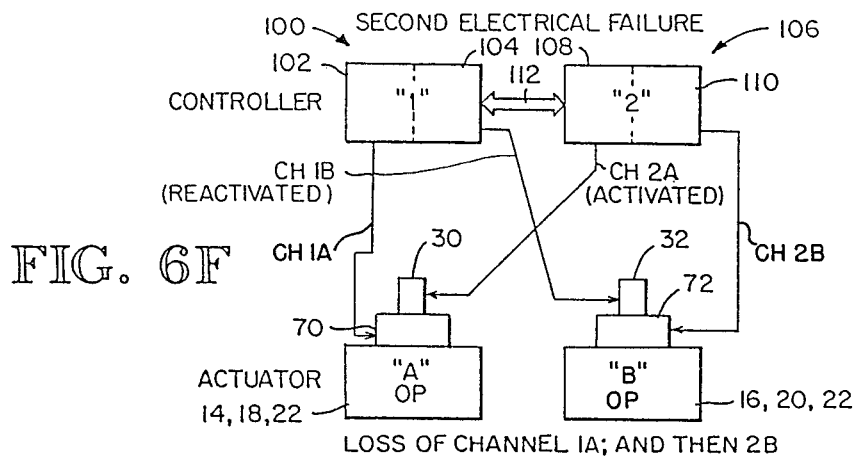

The loss of a primary or a secondary controller is basically a simultaneous loss of two primary or two secondary channels, as illustrated in FIGS. 6D or 6E. In the event of the loss of a primary controller, as shown in FIG. 6D, the primary channels 102, 104 are then disabled and the secondary channels 108, 110 of the secondary controller are activated. The servovalves 30, 32 receive control signals from the secondary channels 108, 110, respectively. The primary channels 102, 104 apply bypass signals to their respective bypass valves 70, 72 as long as no additional channel failure occurs.

In the event of the loss of a secondary controller, as illustrated in FIG. 6E, the primary channels 102, 104 continue to drive the electrohydraulic servovalves 30, 32, respectively, in the normal operating manner. The secondary channels 108, 110 apply bypass signals to their respective bypass valves 70, 72, but the bypass valves do not shift to their bypass mode until the next failure occurs. Thus, in the event of a first electrical failure, the flight control system remains fully operational.

A second electrical failure can occur in one of four modes illustrated in FIGS. 6F–I. In the example illustrated in FIG. 6F, the primary channel 102 fails, followed by failure of the secondary channel 110. It will be recalled that when the primary channel 102 fails, the primary controller 100 disables itself and the secondary controller becomes enabled so that when the secondary channel 110 failed, the electrohydraulic servovalves 30, 32 were driven by the secondary channels 108, 110. The failure of the secondary channel 110 is then detected and the non-failed primary channel 104 is reactivated to take over control of the secondary electrohydraulic servovalve 32.

Figure 6G:
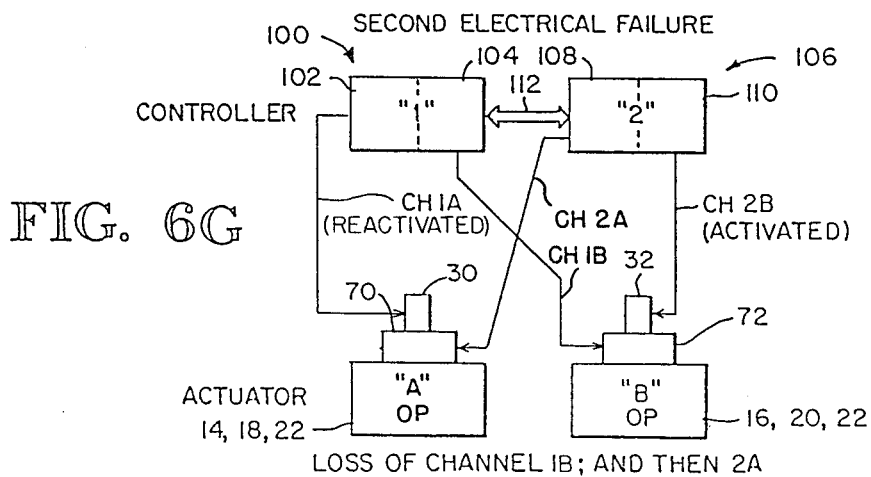

In FIG. 6G, it is assumed that the primary channel 104 failed, followed by a failure of the secondary channel 108. Similarly, as in the example of FIG. 6F, when the primary channel 104 failed, the primary controller 100 was disabled and the secondary controller 106 was enabled so that the electrohydraulic servovalves 30, 32 were being driven by the secondary control channels 108, 110 when the secondary control channel 108 failed. The failure is then detected and the non-failed primary channel 102 is reactivated to take over control of the first electrohydraulic servovalve 30 from the failed secondary controller channel 108. When the primary channel 104 failed, it applied a bypass signal to the bypass valve 72. When the secondary channel 108 fails, it applies a bypass signal to the bypass valve 70. However, since both of the bypass valves 70, 72 are receiving only one bypass signal, they do not shift to their bypass modes. The system thus remains fully operational.

Figure 6H:
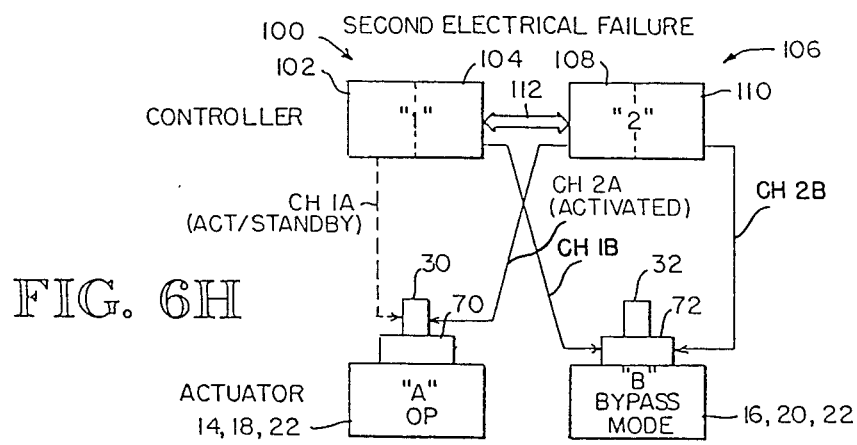

In the example illustrated in FIG. 6H, the primary channel 104 has failed, followed by a failure of the secondary channel 110. When the primary channel 104 fails, control shifts from the primary controller 100 to the secondary controller 106. Thus, when the secondary channel 110 failed, the electrohydraulic servovalves 30, 32 were being driven by the secondary controller channels 108, 110 and the primary controller 1094 had applied a bypass signal to the bypass valve 72. When the secondary controller channel 110 fails, it is not possible for another channel to take over the control of the electrohydraulic servovalve 32 since the primary channel 104 driving that valve has already failed. Consequently, the secondary channel 110 applies a second bypass signal to the bypass valve 72, thus shifting the bypass valve 72 to its bypass mode. The first electrohydraulic servovalve 30 continues to operate under control of the first secondary channel 108. Thus, the system continues to operate, although the maximum force that the actuator can generate is reduced by fifty percent. Channel 102 remains operational as an active/standby channel. Further, either active channel 108 or active/standby channel 102 can fail, but the system remains operational with one valve and one actuator.

Figure 6I:
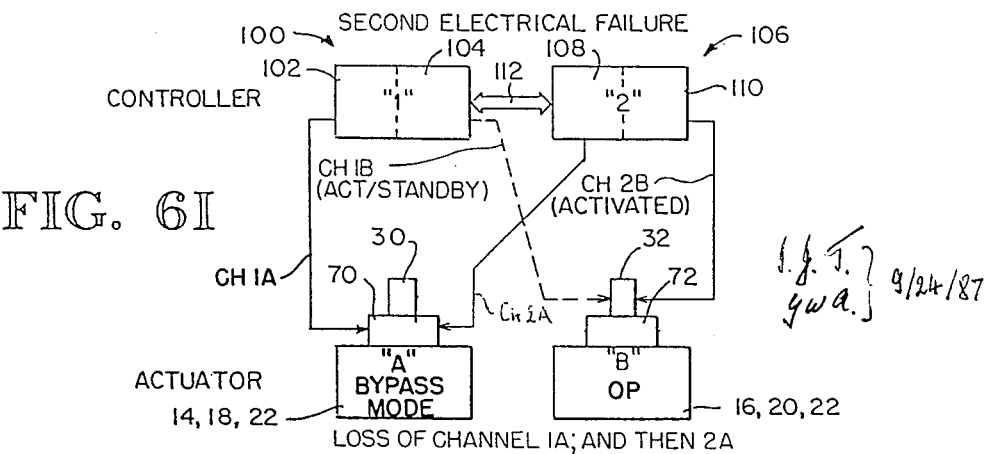
Figure 6J:
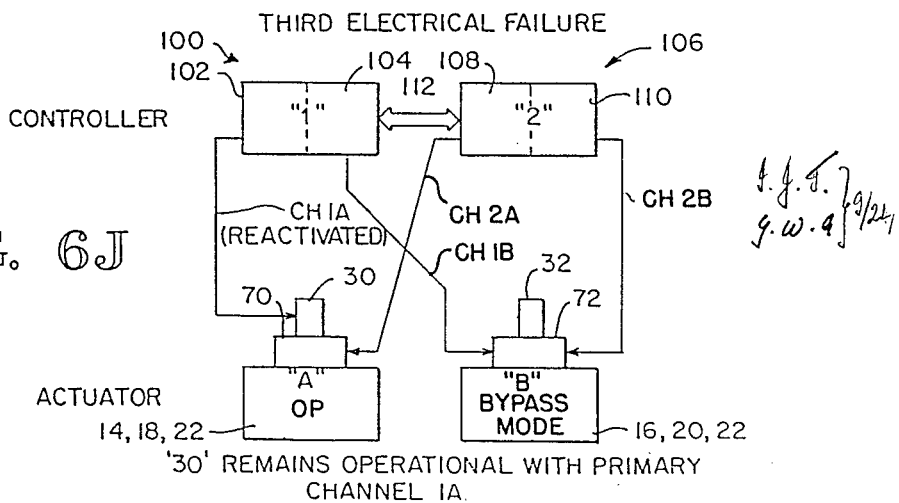

With reference to FIG. 6I, the final example of a second electrical failure is the loss of the first primary channel 102 followed by the loss of the first secondary channel 108. This situation is, in effect, the same as the failure of the second primary channel 104 followed by the failure of the second secondary channel 110 illustrated in FIG. 6F. It results in the bypass valve 70 shifting to its bypass mode, thus disabling the first actuator 14, 18, 22 and continues to operate the second electrohydraulic servovalve 32 through the secondary channel 110. As before, the system remains operational.

The flight control system can continue to operate with a third electrical failure, as illustrated in FIGS. 6J–M. In the example illustrated in FIG. 6J, it is assumed that the secondary primary channel 104 and the second secondary channel 110 driving the second electrohydraulic servovalve 32 have failed along with the first secondary channel 108 driving the first electrohydraulic servovalve 30. Under these circumstances, the second primary channel 104 and the second secondary channel 110 apply respective bypass signals to the bypass valve 72 to disable the second actuator 16, 20, 22. The first electrohydraulic servovalve 30 continues to operate through the first primary channel 102.

Figure 6K:
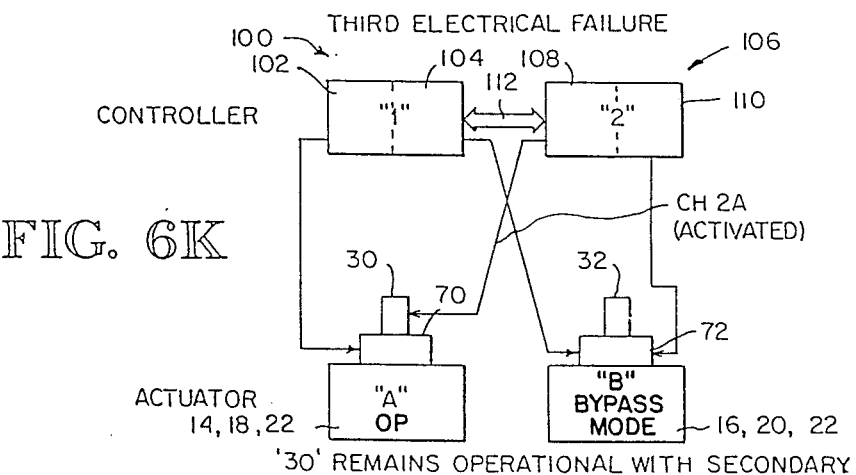

In the second example, illustrated in FIG. 6K, both primary channels 102, 104 and the second secondary channel 110 have failed. Under these circumstances, the bypass valve 72 has been shifted to its bypass mode by bypass signals output by the second primary controller channel 104 and the second secondary controller channel 110. The first primary controller channel 102 also outputs a bypass signal to the bypass valve 70, but the bypass valve 70 does not shift to its bypass mode at that time, since it is receiving a single bypass signal. The first electrohydraulic servovalve 30 remains operational under control of the first secondary channel 108.

Figure 6L:
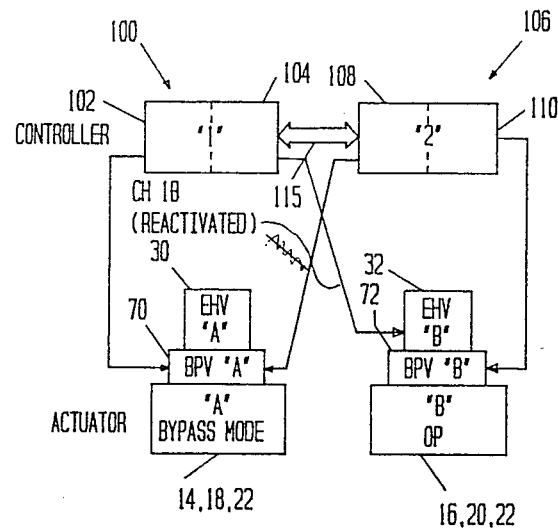

The example illustrated in FIG. 6L is the reverse of the example illustrated in FIG. 6I. As explained above, in the event one primary channel 102 and both secondary channels 108, 110 fail, the first electrohydraulic servovalve 30 for the failed primary channel 102 becomes inoperative and the bypass valve 70 for that electrohydraulic servovalve 30 is shifted to its bypass mode. The other electrohydraulic servovalve 32 continues to remain operational under control of the primary channel 104 that remains operational.

Figure 6M:
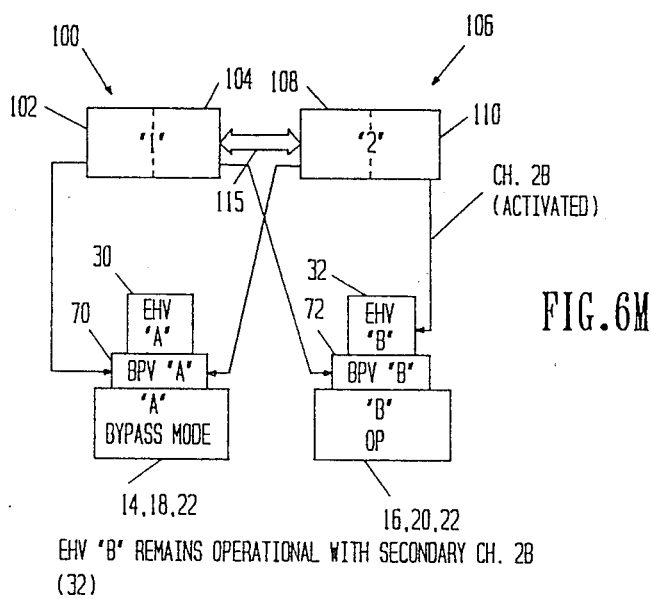

Finally, the example illustrated in FIG. 6M is essentially the same as the example illustrated in FIG. 6K. As above, a failure of both primary channels 102, 104 and one secondary channel 108 leaves the actuator 14, 18, 22 associated with the failed secondary channel 108 inoperable since the bypass valve 70 receives a bypass signal from the first primary controller channel 102 and from the first secondary controller channel 108. The second electrohydraulic servovalve 32 remains operational under control of the second secondary channel 110.

The operational failure modes for the second embodiment are illustrated in the truth table of FIG. 8. Once again, of sixteen possible failure modes, only one—the failure of all four control channels or the failure of multi-electrohydraulic servovalves—renders the system totally inoperative. The inventive flight control system thus achieves a high degree of redundancy using relatively few redundant components.

In the event of a failure of a channel of the primary controller 100 or a failure of the primary controller 100, control is transferred entirely to the secondary controller 106. As a result, a potential transfer transient problem can occur in which the electrohydraulic servovalves are controlled by neither or both controllers 100, 106. These transfer transients can be avoided by using a synchronization scheme in event of one primary channel failure. First, the failed channel 102 or 104 of the primary controller 100 applies its bypass signal to its respective bypass valve 70 or 72. Second, the corresponding channel 108 or 110 of the secondary controller 106 is activated while the non-failed channel of the primary controller 100 is still active. Finally, the non-failed channel of the primary controller 100 is disabled, thereby completing the transfer of control to the secondary controller 106. A similar transfer procedure can be used to transfer control from the secondary controller 106 to the primary controller 100.

The failure modes described above involve failure of an active channel followed by either transfer of control to another channel or bypass of the failed channel. However, latent failures can also occur in which an inactive channel fails so that it is not available when an attempt is made to transfer control from a failed channel. A latent failure is potentially very dangerous if the system has no way of detecting the failure prior to an attempted transfer, because the latent failure is, in effect, a loss redundancy. Latent failures can be detected by monitoring the operation of all components, including those that are inactive, at all times. This may require that all channels of the controllers 100, 106 be operational at all times in their normal operational mode. As a result, each electrohydraulic valve 30, 32 can be continuously monitored by the respective channels of the controllers 100, 106.

The operation of some components, such as the bypass valves 70, 72, cannot be monitored and checked during flight because this would prevent the flight control system from operating properly. These components should be checked periodically during a preflight inspection.

It is thus seen that the inventive flight control system remains operational in the event of at least three electrical failures, although the maximum force that the actuator is capable of delivering is reduced by fifty percent. It will also be apparent that the system can remain operational with failures in excess of three as long as the additional failures do not occur in the remaining operable channel.

What is claimed is:

1. A hydraulic flight control system comprising:
   a tandem hydraulic actuator having an actuating rod connected to a pair of pistons mounted in respective first and second cylinders;
   first and second electrohydraulic servovalves controlling the flow of hydraulic fluid into and out of said first and second hydraulic cylinders, respectively, each of said electrohydraulic servovalves being controlled by a pair of actuating coils;
   first controller means receiving a first flight control signal, said first controller means having a primary control channel that provides a primary output to one actuating coil of said first electrohydraulic servovalve for normally operating said first electrohydraulic servovalve, and a secondary control channel that provides a secondary output to the other actuating coil of said first electrohydraulic servovalve for operating said first electrohydraulic servovalve in response to a first enable signal;
   second controller means receiving a second flight control signal, said second controller means having a primary control channel that provides a primary output to one actuating coil of said second electrohydraulic servovalve for normally operating said second electrohydraulic servovalve, and a secondary control channel that provides a secondary output to the other actuating coil of said second electrohydraulic servovalve for operating said second electrohydraulic servovalve in response to a second enabling signal; and
   monitor and control logic means monitoring the performance of said first and second controller means, first and second electrohydraulic servovalves and actuator, said monitor and control logic means generating said first and second enable signals in the event that the primary channels of the first and second controller means are incapable of generating their respective primary outputs so that each of said electrohydraulic servovalves is operated by only one channel of its respective controller means at a time and, in the event of a malfunction in its respective primary channel or electrohydraulic servovalve connected to said primary channel, said electrohydraulic servovalve is operated by the secondary channel of its controller means.

2. The flight control system of claim 1, further comprising:
   first and second pairs of valve position sensors operatively associated with said first and second electrohydraulic servovalves, respectively, said sensors generating respective sensor outputs indicative of the operation of said valves, said sensor outputs providing valve feedback signals to said first and second controller means, respectively; and comparator means receiving the valve feedback signals from said first and second valve position sensors, said comparator means comparing said valve feedback signals to each other to provide an indication of a failure in the event of a negative comparison.

3. The flight control system of claim 2 wherein said comparator means further comprise said valve feedback signals to respective reference signals that correspond to the expected values of said feedback signals as a function of said respective flight control signals, thereby providing an additional indication of a failure in the event of a negative comparison.

4. The flight control system of claim 1, further comprising:

first and second valve position sensors operatively associated with said first and second electrohydraulic servovalves, respectively, said sensors generating respective sensor outputs indicative of the operation of said valves, said sensor outputs providing valve feedback signals to said first and second controller means, respectively; and first and second comparator means receiving the valve feedback signals from said first and second valve position sensors, respectively, said first and second comparator means comparing said valve feedback signals to respective reference signals that correspond to the expected values of said valve feedback signals as a function of said respective flight control signals, thereby providing an indication of a failure in the event of a negative comparison.

5. The flight control system of claim 1, further including first and second position sensors coupled to the actuating rod and generating respective actuator position signals indicative of the position of said actuating rod, said first and second actuator position signals being coupled to the control channels of said first and second controller means respectively, and being compared to said first and second flight control signals, respectively, to generate respective first and second error signals indicative of the difference between the actual position of said actuating rod and the position of said actuating rod designated by said first and second flight control signals, said first and second error signals being amplified by the control channels of said first and second controller means to provide respective outputs to said first and second electrohydraulic servovalve actuating coils.

6. The flight control system of claim 1 wherein said first and second controller means are driven by respective first and second flight control signals, thereby allowing said flight control system to continue operating in the event of a malfunction in the generation of at least one of said flight control signals.

7. The flight control system of claim 1, further including first and second bypass valve means for said first and second cylinders, respectively, each of said bypass valve means being operative to bypass the piston in its respective cylinder responsive to malfunction of both the primary and secondary control channels of the respective controller means.

8. In an aircraft having at least one flight control surface and a flight control computer generating flight control commands from manual control inputs, an improved flight control system comprising:

a tandem hydraulic actuator having an actuating rod connected to a pair of pistons mounted in respective first and second cylinders, said actuating rod being connected to one of said flight control surfaces;

first and second electrohydraulic servovalves controlling the flow of hydraulic fluid into and out of said first and second hydraulic cylinders, respectively, each of said electrohydraulic servovalves being controlled by a pair of actuating coils, said first and second electrohydraulic servovalves each having valve operation sensors generating respective first and second valve feedback signals indicative of the operation of said valve;

first and second pairs of actuator rod position sensors generating respective actuator rod position signals indicative of the position of said actuating rods;

a first controller means generating primary and secondary control signals through respective primary and secondary control channels as a function of said first flight control signal and respective actuator rod position signals from said first pair of actuator rod position sensors, said primary and secondary control channels being connected to the actuating coils of said first electrohydraulic servovalve;

a second controller means generating primary and secondary control signals through respective primary and secondary control channels as a function of said second flight control signal and an actuator rod position signal from said second pair of actuator rod position sensors, said primary and secondary control channels of said second controller means being connected to the other actuating coils of said second electrohydraulic servovalve; and monitor and control means receiving said valve feedback signals, said monitor and control means comparing the valve feedback signals from said first and second electrohydraulic servovalves to respective first and second reference signals corresponding to the expected first and second valve feedback signals resulting from said first and second flight control signals, respectively, and, in the event of said first and second valve feedback signals correspond to said first and second valve reference signals, respectively, enabling the primary channel of said first and second controller means, respectively, and, in the event that said first and second valve feedback signals do not correspond to said first and second valve reference signals, respectively, enabling the secondary channels of said first and second secondary controller means, respectively.

9. The flight control system of claim 8 wherein said first and second controller means are driven by respective flight control signals, thereby allowing said flight control system to continue operating in the event of a malfunction in the generation of at least one of said flight control signals.

10. The flight control system of claim 1 wherein the primary and secondary channels of each of said controller means are implemented by respective properly programmed microprocessors that are electrically isolated from each other.

11. A hydraulic flight control system comprising:

a tandem hydraulic actuator having an actuating rod connected to a pair of pistons mounted in respective first and second cylinders;

first and second electrohydraulic servovalves controlling the flow of hydraulic fluid into and out of said first and second hydraulic cylinders, respectively, each of said electrohydraulic servovalves being controlled by a pair of actuating coils;

primary controller means receiving a first flight control signal, said primary controller means having a first control channel that provides a first primary output through one actuating coil of said first electrohydraulic servovalve for normally operating said first electrohydraulic servovalve, said primary controller means further having a second control channel that provides a second primary output to one actuating coil of said second electrohydraulic servovalve for normally operating said second electrohydraulic servovalve;

secondary controller means receiving a second flight control signal, said secondary controller means having a first control channel that provides a first secondary output to the other actuating coil of said first electrohydraulic servovalve for operating said first electrohydraulic servovalve in response to a first enable signal, said secondary controller means further having a second channel that provides a second secondary controller to the other actuating coil of said second electrohydraulic servovalve for operating said second electrohydraulic servovalve in response to a second enable signal; and monitor and control logic means monitoring the performance of said primary and secondary controller means, first and second electrohydraulic servovalves and actuator, said monitor and control logic means generating said first and second enable signals in the event that respective first and second channels of said primary controller means are incapable of generating their respective first and second primary outputs so that each of said electrohydraulic servovalves is operated by a respective channel of said primary controller means and, in the event of a malfunction in its respective control channel or electrohydraulic servovalve connected to said control channel, said electrohydraulic servovalve is operated by the corresponding channel of said secondary controller means.

12. The flight control system of claim 11 further comprising:

first and second valve position sensors operatively associated with said first and second electrohydraulic servovalves, respectively, said sensors generating respective sensor outputs indicative of the operation of said valves, said sensor outputs providing valve feedback signals to said primary and secondary controller means, respectively; and comparator means receiving the valve feedback signals from said first and second valve position sensors, said comparator means comparing said feedback signals to each other to provide an indication of a failure in the event of a negative comparison.

13. The flight control system of claim 12 wherein said comparator means further compares said valve feedback signals to respective reference signals that correspond to the expected values of said feedback signals as a function of said first and second flight control signals, thereby providing an additional indication of a failure in the event of a negative comparison.

14. The flight control system of claim 11, further comprising:

first and second pairs of valve position sensors operatively associated with said first and second electrohydraulic servovalves, respectively, said sensors generating respective sensor outputs indicative of the operation of said valves, the sensor outputs from said first pair of valve position sensors providing respective pairs of valve feedback signals to the first control channels of said primary and secondary controller means, and the outputs from said second pair of valve position sensors providing respective valve position signals to the second control channels of said primary and secondary controller means; and first and second pairs of comparator means receiving respective valve feedback signals from said first and second pairs of valve position sensors, said first pair of comparator means comparing respective valve feedback signals from said first pair of valve position sensors to respective reference signals generated by the first channels of said primary and secondary controller means, said reference signals corresponding to the valve feedback signals that are expected from said first pair of said valve position sensors as a function of said first flight control signal, said second pair of comparator means comparing respective valve feedback signals from said secondary pair of valve position sensors to respective reference signals generated by the second channels of said primary and secondary controller means, said reference signals corresponding to the valve feedback signals that are expected from said second pair of said valve position sensors as a function of said second flight control signal.

15. The flight control system of claim 11, further including first and second position sensors coupled to said actuating rod and generating respective actuator position signals indicative of the position of said actuating rod, said first and second actuator position signals being coupled to the first and second control channels of said first and second controller means, respectively, and being compared to said first and second flight control signals, respectively, to generate respective first and second error signals indicative of the difference between the actual position of said actuating rod and the position of said actuating rod designated by said first and second flight control signals, respectively, said first and second error signals being amplified by the first and second control channels, respectively, of said controller means to provide respective outputs to said first and second electrohydraulic servovalve actuating coils.

16. The flight control system of claim 11 wherein said primary and secondary controller means are driven by respective first and second flight control signals, thereby allowing said flight control system to continue operating in the event of a malfunction in the generation of one of said flight control signals.

17. The flight control system of claim 11 wherein said primary and secondary controller means further include cross-channel voting means for comparing the operation of said primary and secondary controller means with each other to determine the existence and identity of a failed controller means.

18. The flight control system of claim 1, further including first and second bypass valve means toward first and second cylinders, respectively, each of said bypass valve means being operative to bypass the piston in its respective cylinder responsive to malfunction of both corresponding channels of the primary and secondary controller means.

19. In an aircraft having at least one flight control surface and at lease one flight control computer generating first and second flight control signals from manual control inputs, an improved flight control system comprising:

a tandem hydraulic actuator having an actuating rod connected to a pair of pistons mounted in respective first and second cylinders, said actuating rod being connected to said flight control surface;

first and second electrohydraulic servovalves controlling the flow of hydraulic fluid into and out of said first and second hydraulic cylinders, respectively, each of said electrohydraulic servovalves being controlled by a pair of actuating coils, said first and second electrohydraulic servovalves each having a valve operation sensor generating respective first and second valve feedback signals indicative of the operation of said valves;

first, second, third and fourth actuator rod position sensors generating respective actuator rod position signals indicative of the position of said actuating rods;

primary controller means having a first control channel generating a first control signal as a function of said first flight control signal and a first actuator rod position signal from said first actuating rod position sensor, said first control channel being connected to one actuator coil of said first electrohydraulic servovalve, said primary controller means further having a second control channel generating a second control signal as a function of said second flight control signal and a second actuator rod position signal from said second actuator rod position sensor, said second control channel being connected to one actuating coil of said second electrohydraulic servovalve;

secondary controller means having a first channel generating a third control signal as a function of said first flight control signal and a third actuator rod position signal from said third actuator rod position sensor, said first control channel being connected to the other actuating coil of said first electrohydraulic servovalve, secondary controller means further having a second control channel generating a fourth control signal as a function of said second flight control signal and a fourth actuator rod position signal from said fourth actuating rod position sensor, said control channel being connected to the other actuator coil of said second electrohydraulic servovalve; and monitor and control means receiving said valve feedback signals, said monitor and control means comparing the valve feedback signal from said first and second electrohydraulic servovalves to respective first and second electrohydraulic servovalves to respective first and second reference signals corresponding to the expected first and second valve feedback signals resulting from said first and second flight control signals, respectively, and, in the event that said first and second valve feedback signals correspond to said first and second valve reference signals, respectively, enabling the respective control channel of said primary control means and, in the event that said first and second valve feedback signals do not correspond to said first and second valve reference signals, respectively, enabling the respective control channels of said secondary controller means.

20. The flight control system of claim 19 wherein each of said controller means is driven by respective first and second flight control signals, thereby allowing said flight control system to continue operating in the event of a malfunction in the generation of one of said flight control signals.

21. The flight control system of claim 19 wherein said primary and secondary controller means further include cross-channel voting means for comparing the operation of said first and second controller means with each other to determine the existence and identity of a failed controller means.

22. The flight control system of claim 19 wherein the first and second channels of said primary and secondary controller means are implemented by respective properly programmed microprocessors that are electrically isolated from each other.

* * * * *

UNITED STATES PATENT AND TRADEMARK OFFICE
CERTIFICATE OF CORRECTION

PATENT NO. : 4,887,214

DATED : December 12, 1989

INVENTOR(S) : Imre J. Takats; George W. Aziz

It is certified that error appears in the above-identified patent and that said Letters Patent is hereby corrected as shown below:

In claim 3, column 15, line 10, delete "comprise" and substitute therefor --compares--.

In claim 8, column 16, line 43, delete "of" and substitute therefor --that--.

Signed and Sealed this

Sixth Day of November, 1990

Attest:

HARRY F. MANBECK, JR.

*Attesting Officer*  *Commissioner of Patents and Trademarks*